United States Patent
Jaffe

[15] 3,645,620
[45] Feb. 29, 1972

[54] PHOTOGRAPHIC SLIDE COPYING APPARATUS

[72] Inventor: Daniel L. Jaffe, 5708 Beech Avenue, Bethesda, Md. 20034

[22] Filed: June 25, 1969

[21] Appl. No.: 836,320

[52] U.S. Cl. ..............................355/63, 315/97, 323/22 SC, 355/69
[51] Int. Cl. ......................................................G03b 27/76
[58] Field of Search ...................355/63, 64, 69, 71; 315/97; 323/22 SC

[56] References Cited

UNITED STATES PATENTS

| | | | |
|---|---|---|---|
| 3,044,351 | 7/1962 | Patterson | 355/63 X |
| 3,060,796 | 10/1962 | Muse, Jr. | 355/71 |
| 3,065,667 | 11/1962 | Edgerton | 355/68 X |
| 3,325,682 | 6/1967 | Elliott, Jr. | 315/97 |
| 3,331,013 | 7/1967 | Cunningham | 323/22 SC |

*Primary Examiner*—Samuel S. Matthews
*Assistant Examiner*—Richard A. Wintercorn
*Attorney*—Edwin E. Greigg

[57] ABSTRACT

A photographic copying apparatus utilizing a housing with an opening therein which is adapted to receive a photographic transparency to be copied by a copying camera mounted exterior to the housing. Within the housing, there is an electronic flash unit mounted within a cup-shaped reflector at the apex of which there is supported an illuminating viewing lamp having a variable intensity control for compensating for tonal differences in the transparencies. The flash unit, the illuminating lamp, the opening and the camera lens are all in alignment and when the flash unit is energized, it throws up a highly uniform pattern of light to the transparency by virtue of the combined diffusing surfaces of the spherical view lamp and the cup-shaped reflector.

2 Claims, 3 Drawing Figures

PATENTED FEB 29 1972 3,645,620

INVENTOR
DANIEL L. JAFFE

BY Edwin E. Greigg
ATTORNEYS

PHOTOGRAPHIC SLIDE COPYING APPARATUS

This invention relates to a photographic apparatus and more particularly to such an apparatus for copying photographic transparencies in enlarged scale.

In the normal procedure for copying transparencies, for example, film which produces a color diapositive, it is necessary to first align the transparency to be copied with the copying camera and then to properly focus the copying camera prior to the energization of the flash unit during the copying operation. For this purpose a light source is normally provided to illuminate the transparency to be copied to thereby facilitate focusing of the copying camera before the copying operation. The purpose of this invention is to improve upon the method above outlined by providing a variable intensity light source for illuminating the transparency to be copied prior to energization of the flash unit during the copying operation. The use of a variable intensity viewing light allows focusing on slides having difficult light patterns or dark patterns which are difficult to view under normal conditions. Also those slides which have faint or light patterns of large white areas may be viewed by means of a low-intensity setting of the illuminating lamp according to this invention without discomfort to the eye that would normally occur with a fixed intensity lamp. The variable intensity illuminating lamp also allows compensation for lamp age. In tungsten lamps which are normally used for this purpose the age of the lamp affects the lamp's intensity causing it to become lessened and which results in a spectrum shift toward the reds. Thus, when the viewing lamp is used as a standard for measuring density of the slide to be copied in conjunction with a light meter, a shift in the spectrum will cause the standard to change with relation to the light meter response. The ability to increase or compensate for intensity by use of a variable intensity lamp according to the principles of this invention provides the necessary correction for spectrum shifts and eliminates the need to reevaluate the standard at regular intervals when using a fixed intensity lamp, thus simplifying the use of a copying apparatus for compensating for various densities of the slides to be copied.

In devices such as that described above, it is desirable to have a uniform dispersion of light from the flash unit on the transparency to be copied. This result is often difficult to achieve because of the tendency of high-voltage flashlamps to produce hot spots on the surface area to be illuminated. Normally reflectors are provided for distributing the light in a more uniform manner, however, this arrangement has proven to be only partially satisfactory since such apparatuses when measured for uniformity of light intensity on the transparency surface have been found to still produce a variable pattern of light intensity. The present invention makes a substantial contribution to the art by providing an arrangement of light sources and a reflector which throws up a high degree of uniformity of light on the transparency surface with less than 3 percent variation.

Accordingly, it is an object of this invention, to provide a photographic copying apparatus employing an electronic flash unit and a low-voltage source of illumination having a variable intensity control for illuminating the transparency to be copied for proper orientation and thus to enable the camera to be properly adjusted for focus and for the desired degree of magnification of the image.

It is another object of this invention to provide a photographic copying apparatus utilizing an electronic flash unit and an illuminating viewing lamp with both sources of light aligned within the confines of a cup-shaped reflector and wherein the flash unit is enabled to throw a uniform pattern of light on the transparency to be copied by means of the combined reflective surfaces of the viewing lamp and the cup-shaped reflector.

According to one aspect embodying the principles of this invention, there is provided a photographic copying apparatus having a housing with an opening therein which is adapted to receive a photographic transparency to be copied. The housing is provided with an electronic flash unit which is mounted within a cup-shaped reflector, at the apex of which there is supported an illuminating lamp for viewing the transparency having a variable intensity control. The flash unit, the illuminating lamp, the opening and the camera lens are all in alignment and when the flash unit is energized it throws up a highly uniform pattern of light to the opening upon which the transparency is supported by virtue of the combined reflecting surfaces of the spherical view illuminating lamp and the cup-shaped reflector surround it.

Other objects and advantages will become apparent from the following specification and drawings in which.

Figure 1:
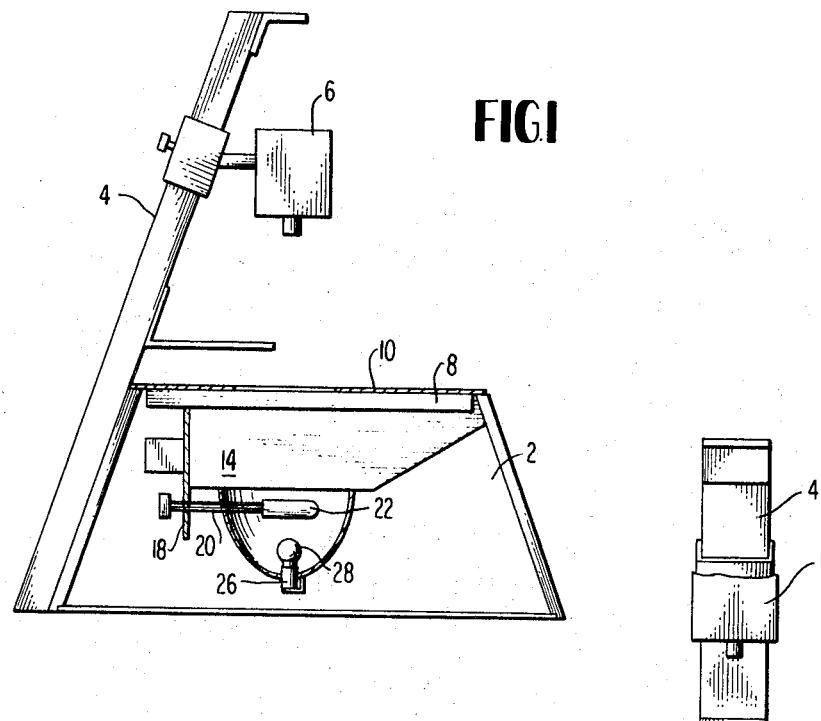
FIG. 1 is a side elevational view of the photographic copying apparatus constructed according to the principles of this invention.
Figure 2:
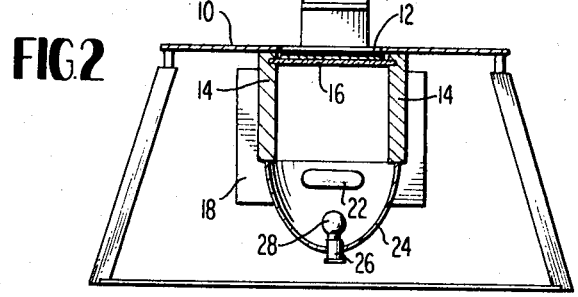
FIG. 2 is a front elevational view of the apparatus shown in FIG. 1.

Referring now to FIG. 1, there is shown the photographic copying apparatus utilizing a housing 2 and having an upstanding bracket portion 4 which supports, by suitable strut members, a copying camera 6. The housing 2 is provided with vents 8 along the top surface of the sidewall as shown. The top surface 10 is provided with an opening 12 provided with a translucent member, as best shown in FIG. 2, from which depends a pair of parallel supporting surfaces 14 for supporting a filter folder member 16. Mounted to one pair of end faces of the parallel support members 14 is a printed circuit board 18. Extending from the printed circuit board is a support member 20 for supporting a flash tube 22, which may be any suitable light source, for example, a quartz iodine lamp. Surrounding the flash tube 22 and supported at its peripheral surface by the parallel support members 14 is a cup-shaped reflector member 24. A suitable aperture is provided in the reflector to permit the support member 20 to pass therethrough. Supported at the apex of the reflector 24 is a socket member 26 which, in turn, supports a viewing lamp 28 which may be of the tungsten variety and which extends upwardly from the apex of reflector 24 towards the flash unit 22 such that both the flash tube 22 and the lamp 28 are contained within the interior of the reflector housing.

Figure 3:
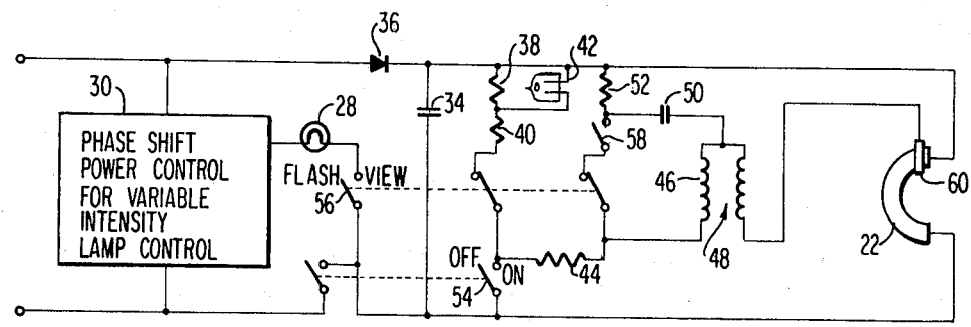
FIG. 3 is a second diagram showing the circuit relationship between the viewing lamp, camera shutter contacts and the flash unit as well as the phase shift control power source for varying the intensity of the viewing lamp.

The printed circuit board 18 contains the circuitry as shown in FIG. 3. An alternating current supply is fed to a phase shift power control transistorized circuit utilizing silicon controlled rectifiers as well known in the art. For the purposes of this invention, a circuit such as that disclosed in U.S. Pat. No. 3,325,682, issued to A. B. Elliott, Jr., or U.S. Pat. No. 3,331,013, issued to R. J. Cunningham, may be utilized. The power control circuit 30 controls the intensity of the lamp 28. A high-voltage electrolytic storage capacitor 34 is charged by means of the rectified alternating current through rectifier 36. Capacitor 34 is directly connected to the main electrodes of the gas discharge flash tube 22 and is discharged as an arc through this flash tube to produce a brilliant flash of light. Connected across capacitor 34 is a bleeder resistor network including resistors 38, 40. Resistor 38 has a neon ready light 42 in parallel therewith to indicate the state of charge of capacitor 34. A further network is connected across capacitor 34 consisting of series-connected resistor 44, the primary winding 46 of trigger coil 48, trigger capacitor 50 and resistor 52.

Operation of the apparatus is controlled by means of the "on-off" switch 54. When the switch is moved to the "off" position, and with a switch 56 in the "view" position, the incandescent lamp 28 is energized such that the transparency to be copied is illuminated for proper orientation and the camera may then be properly adjusted for focus and for the desired degree of magnification of the image. When the switch 54 is in the "on" position, capacitor 34 is charged and the triggering capacitor 50 is charged through a circuit including resistor 44, primary winding 46, capacitor 50 and resistor 52.

The switch 56 in the "view" position maintains the circuit till the ready light 42 opens so that this light indicates the apparatus is not in a condition to produce energization of flash tube 22. Also the circuit to the camera shutter contacts 58 is open so long as switch 56 is in the "view" position. Once the photographer has properly aligned the transparency to be copied and has focused the camera, switch 56 is placed in the "flash" position. This completes the circuit connecting the ready light 42 to capacitor 34 and the ready light 42 is energized to indicate that the apparatus is in a condition to produce energization of flash tube 22. Simultaneously a discharge circuit for capacitor 50 is partially completed. The photographer can then actuate the shutter of the camera and thereby simultaneously close the shutter contacts 58 as shown. This completes a circuit such that the capacitor 50 is discharged through a primary winding 46 of the trigger coil 48. A high-voltage pulse is applied between the triggering electrode 60 of the flash tube 22 and the electrode connected to the circuit line. As is well known, this produces ionization of the inert gas and flash tube and capacitor 34 is discharged through the flash tube to produce a brilliant flash of light illuminating the slide to be copied and entering the lens of the camera to reproduce the transparency on the film within the camera.

The arrangement of the viewing lamp 28 at the center of the cup-shaped reflector 24 and below the flash tube 22 significantly enhances the diffusion of light in the flash tube 22 in uniform pattern on the transparency located at the top of the housing 2. Thus, when the flash tube 22 emits its flash of light, the rays not only reflect from the surface of the reflector 24, but they also bounce off the spherical surface of the lamp 28 which, in effect, enhances a dense, random pattern of reflected rays which illuminate the top of the housing in a uniformly intense pattern. It has been found that without the presence of the bulb or lamp 28 at the bottom of the reflector cup 24, the light pattern on the top of the housing, that is, on the transparency, is not as uniform and varies in intensity as much as 20 percent or more throughout the area being illuminated.

Further, by varying the control of light intensity in the viewing lamp by means of the control circuit 30, it is possible to allow for focusing the camera on dark, difficult to see slides by allowing an increase in light intensity well beyond that required or desired for viewing a normal slide, or, on the other hand, if the slide proves to be very light having large white areas, it is possible to lower the intensity of the viewing lamp, to thereby enable focusing without discomfort to the eye. Also, with a variable intensity control provided for the lamp 28, a safeguard is provided to prevent spectrum shift of the lamp toward the reds after continued use. This spectrum shift can be compensated for by increasing the intensity of the lamp 28, thus eliminating the need to reevaluate any derived standards relating to light meter response.

What is claimed is:

1. A photographic apparatus for copying a photographic transparency comprising a hollow housing having a horizontally disposed opening in the top surface thereof, a copying camera mounted exterior to said housing, a translucent member positioned in said opening for supporting the photographic transparency to be copied, a high-voltage electronic flash unit mounted within said housing having an electronic flash tube mounted directly beneath the opening in said housing, a cup-shaped reflector surrounding said flash tube and having a socket means supported in the apex thereof, a low-voltage source of illumination positioned in said socket so that it is entirely contained within said reflector, synchronization means controlled by said copying camera for energizing said electronic flash unit in synchronization with the actuation of the shutter of said copying camera, and a phase control power supply circuit for said low-voltage source of illumination for varying the intensity of illumination produced by said source, said light passing through the opening of said housing to facilitate the positioning of the transparency in the focusing of said copying camera.

2. A photographic apparatus for copying a photographic transparency comprising a hollow housing having a horizontally disposed opening in the top surface thereof, a copying camera counted at a fixed position to the exterior of said housing, the lens of said camera being in alignment with the opening in said housing, a horizontally disposed translucent member positioned in said opening for supporting the photographic transparency to be copied, a high-voltage electronic flash unit mounted within said housing having an electronic flash tube mounted directly beneath the opening in said housing, a cup-shaped reflector surrounding said flash tube and having a socket means supported at the apex thereof, synchronizing means controlled by said copying camera arranged to energize said electronic flash unit in synchronization with the actuation of the shutter of said copying camera, a low-voltage viewing lamp having a substantially spherical surface positioned in said socket means and surrounded by said cup-shaped reflector, said reflector together with said lamp controlling the light produced by said flash tube and uniformly directing said light to the opening in said housing to thereby illuminate the transparent to be copied.

* * * * *